June 16, 1925.                    E. SANDS                    1,541,855
TRAP
Filed Dec. 7, 1923
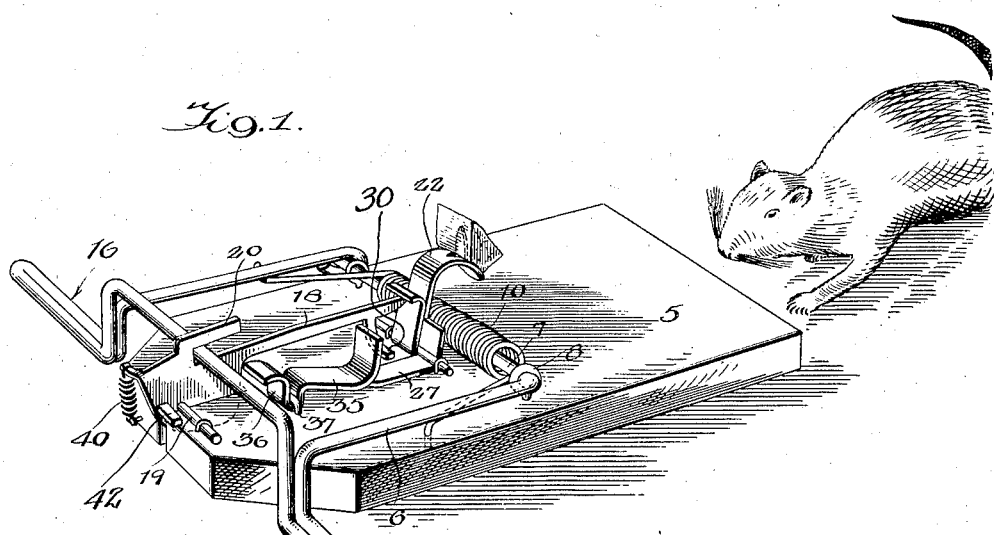
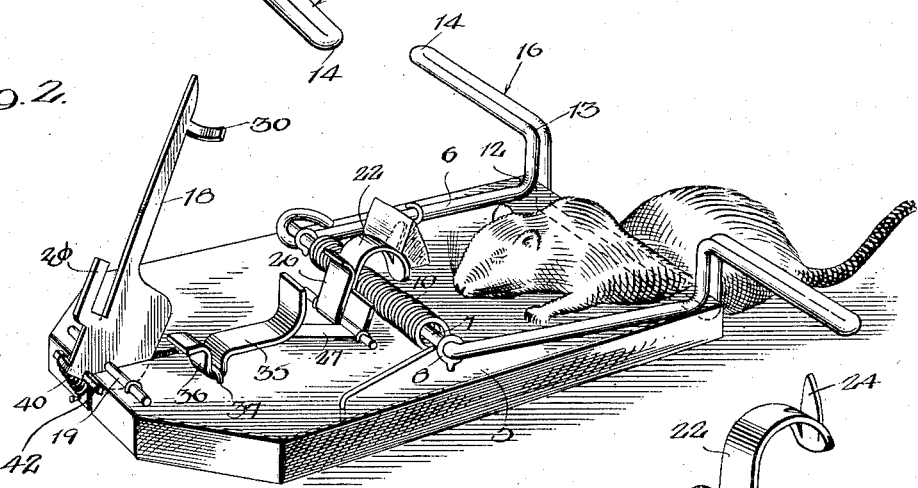
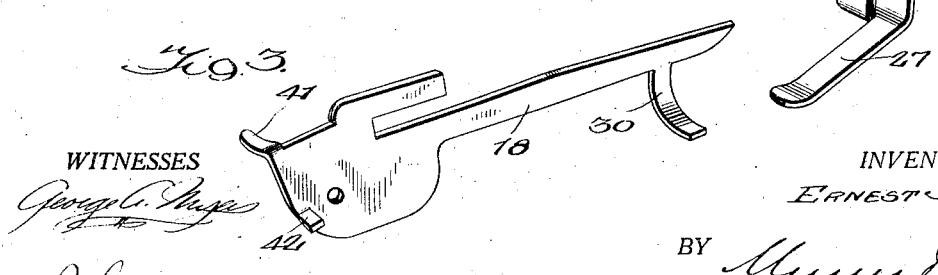
WITNESSES
INVENTOR
ERNEST SANDS,
BY
ATTORNEYS Patented June 16, 1925.

1,541,855

UNITED STATES PATENT OFFICE.

ERNEST SANDS, OF CHARLESTON, SOUTH CAROLINA.

TRAP.

Application filed December 7, 1923. Serial No. 679,143.

*To all whom it may concern:*

Be it known that I, ERNEST SANDS, a citizen of Hungary, residing at Charleston, in the county of Charleston, State of South Carolina, have invented certain new and useful Improvements in Traps, of which the following is a specification.

This invention relates to traps especially adapted for use in connection with rats, mice, and the like.

Briefly stated, an important object of this invention is to provide a spring trap of the character specified having simple and reliable means whereby the trap may be set with safety and without soiling one's hands.

A further object is to provide a trap of the character specified which is of highly simplified construction, durable in use, and cheap to manufacture.

Other objects and advantages will be apparent during the course of the following description.

In the accompanying drawing, forming a part of this application, and in which like numerals are employed to designate like parts throughout the same, Figure 1 is a perspective of the trap set for operation, Figure 2 is a perspective of the trap sprung, Figure 3 is a perspective of a trigger embodied in the invention, Figure 4 is a perspective of a bait carrier.

In the drawing, wherein, for the purpose of illustration, is shown a preferred embodiment of the invention, the numeral 5 designates a base upon which a U-shaped jaw 6 is mounted. Figure 2 illustrates that the jaw 6 is formed from a single length of wire, one end portion of which is formed with a right angle bend defining a pivot element 7 secured to the base by staples or other fastening elements 8. The usual spring 10 is mounted on the pivot element 7 and has one end engaged with the base while the other end of the spring is engaged with one side of the jaw whereby to swing the jaw to its operative position immediately upon being released.

The wire from which the jaw 6 is formed is provided with right angle bends 12, 13, and 14 which define a pair of L-shaped arms 16 at the corners of the jaw. The gripping portions of the arms 16 extend laterally from the base and when the trap is sprung the arms and more particularly the gripping portions of the same are arranged above the plane of the base. This permits the gripping portions to be conveniently engaged without the possibility of the hands of the operator coming in contact with the animal caught. Furthermore, it is not necessary for the operator to touch that portion of the jaw soiled by the animal.

The bends 12, 13 and 14 so dispose the wire that each of the arms are of a double thickness and consequently are able to withstand the strain incident to the employment of the stout coil spring 10.

The laterally projecting L-shaped arms at the corners of the jaw also form a convenient means whereby the trap may be safely set and in this connection it will be observed that when the jaw is swung rearwardly the bight portion of the same is engaged with the upper longitudinal edge of a trigger 18 horizontally pivoted to the base by a pin 19. Figure 1 illustrates that when the trap is set the bight portion of the jaw is engaged by an overhanging L-shaped retaining member 20 formed integral with the trigger. It might be said that the L-shaped retaining member 20 co-operates with the trigger in defining a socket for the reception of the bight portion of the jaw, whereby the jaw is held in its retracted or set position.

When the jaw is released by the trigger it will of course swing to its advanced position with its bight portion extended beyond the forward end of the base 5 in the manner illustrated in Figure 2. The trigger is held in a set position by a bait carrier 22 formed from a single length of metal curved longitudinally and having an upstanding pin or tooth 24, to which a piece of bait is connected. Figure 4 illustrates that the rear portion of the length of metal from which the bait carrier 22 is formed is provided with a longitudinal incision which defines a trigger holding portion 26 and a rearwardly projecting branch or arm 27. It will be seen that the terminal portion of the trigger holding member 26 is curved longitudinally to overhang and engage the terminal portion of the trigger.

When the jaw is manually moved to the position illustrated in Figure 1 the upper longitudinal edge of the trigger is engaged by the jaw and the trigger is swung downwardly to a position beneath the curved lip of the trigger holding portion 26. Attention is especially directed to the fact that the weight of the bait normally holds the bait carrier in the inclined position illustrated in Figure 2 and thus the lip of the portion 26 would not of its own accord remain in engagement with the trigger. However, as the trigger is swung downwardly by the jaw during the setting of the trap an L-shaped contact arm 30 on the trigger is engaged with the rearwardly projecting branch 27 to swing the bait carrier to its operative position in so far as it is able to. The movement of the bait carrier to its operative position is completed by a weighted lever 35 having a forward curved terminal portion to flatly contact with the top of the branch 27. With the weight of the lever 35 on the branch 27 the weight of the bait on the bait carrier is overcome and the lip of the portion 26 remains in engagement with the terminal portion of the trigger.

Figure 2 illustrates that the intermediate portion of the weighted lever 35 is formed with a rather deep transverse corrugation 36 engaged by a staple or other fastening element 37. Of course the lever 35 is free to swing so that the same will promptly move the bait carrier to its operative position and thereby cause the lip 26 of the bait carrier to engage the trigger.

In operation, a quantity of bait is secured to the bait carrier and the laterally projecting L-shaped arms 16 are manually engaged and are drawn rearwardly so that the jaw will occupy the position illustrated in Figure 1. As previously stated, the rearward movement of the jaw will swing the trigger downwardly so that the contact arm 30 of the same will engage the branch 27 and start the carrier on its initial movement to operative position. Now, the lever 35 comes into operation and completes the movement of the bait carrier so that the curved lip of the part 26 will remain in engagement with the trigger. This permits the arms of the jaw to be released and the trap is set for operation. It might be stated that as soon as the trap is sprung the trigger 18 is swung to its inoperative position by means of a coil spring 40 anchored to the base and to a lug 41 at the rear end of the trigger. The rearward swinging movement of the trigger is, however, limited by a lug 42 on the trigger and which is adapted to engage the base. With reference to the foregoing description taken in connection with the accompanying drawing it will be seen that a trap constructed in accordance with this invention may be set without danger of the operator catching his fingers between the jaw and the base. It is not necessary for the operator to touch the trigger or the bait carrier or is it necessary for the operator to grasp that portion of the jaw soiled by the animal trapped.

The improvements forming the subject-matter of this application do not in any way interfere with the operation of the trap or lessen the utility of the same and the cost is not materially increased as compared with traps now on the market.

It is to be understood that the form of the invention herewith shown and described is to be taken as a preferred example of the same and that such minor changes in arrangement and construction of parts may be made as will remain within the spirit of the invention and the scope of what is claimed.

I claim:

1. A trap comprising a base, a jaw pivotally secured to the base and formed from a single length of wire arranged in U-shaped formation, said length of wire being provided with oppositely located laterally projecting portions constituting gripping members, and a trigger for holding the jaw in set position, said gripping members projecting outwardly from the jaw whereby the arms are spaced from the rodent striking portion of the jaw.

2. A trap comprising a body, a U-shaped spring actuated jaw pivoted to the body and having offset laterally projecting arms provided with gripping portions arranged above the plane of the jaw when the jaw is sprung, and a trigger engaging the bight portion of said jaw.

3. A trap comprising a base, a spring-actuated jaw pivoted to said base and having offset laterally projecting L-shaped arms provided with gripping portions arranged above the plane of the animal striking portion of the jaw when the jaw is sprung, a trigger pivoted to the base and having means to engage the animal contact portion of the jaw, and a bait carrier pivoted to said base and having a lip to engage said trigger.

4. A trap comprising a base, a spring-actuated jaw pivoted to said base and having laterally projecting L-shaped arms provided with gripping portions arranged above the plane of the animal contact portion of the jaw when the jaw is sprung, a trigger pivoted to the base and having means to engage the animal contact portion of the jaw, a bait carrier pivoted to said base and having a holder to engage said trigger, said trigger being provided with a contact arm and said carrier being provided with a rearwardly projecting branch arranged in the path of travel of said contact arm, whereby the downward movement of the trigger results in the rearward swinging of the bait carrier.

5. A trap comprising a base, a spring-actuated jaw pivoted to said base and having laterally projecting L-shaped arms provided with gripping portions arranged above the plane of the animal contact portion of the jaw when the jaw is sprung, a trigger pivoted to the base and having means to engage the animal contact portion of the jaw, a bait carrier pivoted to said base and having a holder to engage said trigger, said trigger being provided with a contact arm and said carrier being provided with a rearwardly projecting branch arranged in the path of travel of said contact arm, whereby the downward movement of the trigger results in the rearward swinging of the bait carrier, and a pivoted lever engaging said branch to swing the bait carrier to operative position and hold the lip of the carrier in engagement with the trigger.

6. A trap comprising a base, a spring-actuated jaw pivoted to said base and having laterally projecting L-shaped arms provided with offset gripping portions, a trigger pivoted to the base and having means to engage the animal contact portion of the jaw, a bait carrier pivoted to said base and having a holder to engage said trigger, said trigger being provided with a contact arm and said carrier being provided with a rearwardly projecting branch arranged in the path of travel of said contact arm, whereby the downward movement of the trigger results in the rearward swinging of the bait carrier, a pivoted lever engaging said branch to swing the bait carrier to operative position and hold the lip of the carrier in engagement with the trigger, said trigger being provided with means whereby the swinging movement of the same is limited, and a spring to swing the trigger to rearward position upon being released.

7. A trap comprising a base, a spring-actuated jaw pivoted to the base, a trigger pivoted to the base and having a longitudinally extending lug engaging the jaw and co-operating with the trigger to define a jaw-receiving socket, a bait carrier horizontally pivoted to the base and having a trigger-engaging lip and being provided with a branch, said trigger being provided with a contact arm to engage said branch to swing said trigger rearwardly, and a lever pivoted to the base and having one end portion extending over and engaging said branch to swing the branch into contact with the base and thereby hold the lip of said carrier in engagement with said trigger.

ERNEST SANDS.